(12) United States Patent
Jang

(10) Patent No.: US 6,411,769 B1
(45) Date of Patent: Jun. 25, 2002

(54) METHOD FOR DETERMINING THE SWITCHING TIME OF INTERMITTENT RECORDING STATE

(75) Inventor: Soo Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/112,315

(22) Filed: Jul. 9, 1998

(30) Foreign Application Priority Data

Jul. 10, 1997 (KR) ............................................. 97-33559
May 22, 1998 (KR) ............................................. 98-18487

(51) Int. Cl.[7] ........................... H04N 5/76; H04N 7/765
(52) U.S. Cl. ........................................... 386/46; 386/52
(58) Field of Search ................................ 386/46, 1, 38, 386/107, 117, 40, 77, 80, 113, 4, 52, 21; 348/143; H04N 5/76, 5/765

(56) References Cited

U.S. PATENT DOCUMENTS 5,432,769 A * 7/1995 Honjo
5,615,017 A * 3/1997 Choi
6,233,391 B1 * 5/2001 Morikawa et al.

* cited by examiner

Primary Examiner—Robert Chevalier
(74) Attorney, Agent, or Firm—Birch, Stewart, Kolasch & Birch, LLP

(57) ABSTRACT

The present invention relates to a method for determining when a tape or a head drum is controlled to resume recording after recording pause period in time-lapse video tape recorder, comprising the steps of confirming a recording time in a time-lapse recording mode set by a user; calculating the maximum storage time, or the time required to store video frames maximally in a field memory based on the recording time; calculating the time elapsed since the video frames begun to be stored in the field memory while keeping storing the video frames; confirming whether the elapsed time is equal to the maximum storage time minus a recording preparation period; either reloading the tape that has been unloaded or rotating the head drum that has been stopped so as to record the video frames in the field memory according to the confirmation result. Thus, the video frames which have been stored maximally in the field memory are retrieved and recorded on the tape successively without waiting time needed to be ready for recording such as the time for either loading the tape or rotating the head drum at a normal rotation speed.

4 Claims, 5 Drawing Sheets

FIG. 7

| time-lapse recording time | maximum storage capacity in time | the time at which recording state changes | ratio of stored video frames to memory capacity at state changing time |
|---|---|---|---|
| 2 H | - | - | - |
| 6 H | 15 | 11 | 73% |
| 12 H | 30 | 26 | 87% |
| 24 H | 60 | 56 | 93% |
| 48 H | 120 | 116 | 96.7% |
| 72 H | 180 | 176 | 97.8% |
| 120 H | 300 | 296 | 98.7% |
| 240 H | 600 | 596 | 99.3% |
| 480 H | 1200 | 1196 | 99.7% |

METHOD FOR DETERMINING THE SWITCHING TIME OF INTERMITTENT RECORDING STATE

BACKGROUND OF THE INVENTION

1. Field of the Invention

The present invention relates generally to a method for determining the state switching time for intermittent recording in time-lapse video tape recorder. More specifically, the present invention relates to a method for determining when magnetic tape starts to be reloaded or head drum does to be rotated to resume to record intermittent video frames which have been stored in memory after recording pause period in time-lapse video tape recorder.

2. Brief Description of the Prior Art

Unlike an ordinary continuous video tape recorder which records every frames of video signals, time-lapse video tape recorder intermittently records video signals from several video cameras or the like on a magnetic tape with a pre-selected regular interval while the recorder repeats running and stopping. It has been used in various areas requiring long-time recording such as a security monitoring system in banks and museums. As shown in FIG. 1, most time-lapse video tape recorders comprise an A/D converter 100 which converts analog video signal from an external video camera into a digital data stream, a buffer memory 201 in which the converted digital video data are stored temporarily; a field memory 202 in which the video data from the buffer memory 201 are stored before they are recorded, a D/A converter 300 which converts the digital video data in the field memory 202 into analog video signal, a recording unit 400 which records the converted analog video signal on the magnetic tape; and a controller 500 which controls writing/reading intervals of video signal from the external video camera to/from memories 201 and 202 according to the command through an input unit 600 from a user.

The recording unit 400 comprises a signal processing unit which processes the video signal for recording; and mechanical elements, shown in FIGS. 2 and 3 such as a loading motor 401 which moves a loading post 1 to load/unload a magnetic tape; a drum motor 402 which rotates a head drum 3 on which video heads 2 are mounted to record/reproduce video signal on the magnetic tape; a capstan motor 403 which rotates a capstan shaft 4 to drive the magnetic tape at a designated tape running speed.

In a conventional time-lapse video tape recorder configured as above, one frame is extracted from continuous video signal from an external video camera at intervals of a predetermined time and is then stored temporarily in the buffer memory 202 after it is digitized by the A/D converter 100. Then, the video frames in the buffer memory 202 are transferred into the field memory 202. This way, continuous video signal is compressed into the digital video signal which is sub-sampled by frame.

On the other hand, when recording pause period, or duration in which no video frame is recorded (duration in which the video frames are stored in the field memory 202), is longer than a reference period of time, the state of the recording unit 400 is changed such that the magnetic tape loaded (FIG. 2) is unloaded (FIG. 3) or the rotation of the head drum 3 is stopped temporarily during the recording pause period.

When the field memory 202 is filled maximally with the extracted video frames, they are retrieved at a time by the controller 500 and are then converted into an analog video signal by the D/A converter 300. The analog video signal begins to be recorded after reloading the tape that has been unloaded during the recording pause period or resuming the rotation of the head drum 3 that has been stopped during the recording pause period. While the video frames in the field memory 202 are recording on the magnetic tape, new video frames are sampled intermittently from continuous video signal and stored in the buffer memory 201 temporarily. As soon as the recording of the video frames in the field memory 202 is completed, the video frames which have been 20 stored in the buffer memory 201 are transferred to the field memory 202, along with video frames which are newly stored in the buffer memory 201 after the completion of the recording operation. Whether or not the video frames stored newly in the buffer memory 201 after the recording operation exists depends on the capacity of the buffer memory 201.

In case of the prior art above, some action is not made to resume recording such as loading of the magnetic tape that has been unloaded during the recording pause period or rotating the head drum 3 that has been stopped during the recording pause period at a normal rotation speed till the field memory 202 is full, or the number of the video frames becomes equal to the capacity of the field memory 202.

Therefore, as shown in FIG. 4, the video frames in the field memory 202 cannot be recorded until the stable recording operation is possible since loading of the magnetic tape. In other words, it is possible to record the video frames stored in the field memory 202 since 4 seconds or so elapses which is required to load the magnetic tape that has been unloaded by driving the loading motor 401 and to make the recording operation stable. Likewise, when the head drum stopping scheme is used in the recording pause period, recording of the video frames is not allowed till the head drum 2 begins to rotate at the normal speed, which usually takes 4 seconds or so.

Because of this additional time for preparation of stable recording, the period in which video frames are kept temporarily in the buffer memory 201 is longer than actual recording time of the video frames in the field memory 202. As a result, the size of the buffer memory 201 should be large enough to accommodate the video frames received from an external video camera during a recording preparation period in which the recorder is ready for recording.

SUMMARY OF THE INVENTION

The primary objective of the present invention is to solve the above mentioned problems in the conventional method and to provide a method for determining when magnetic tape/head drum starts to be reloaded/rotated to resume recording before memory becomes full with intermittent video frames in time-lapse video tape recorder.

The present invention is characterized as a method for determining when magnetic tape/head drum is reloaded/rotated to resume recording in time-lapse video tape recorder which comprises the three steps: calculating an amount of memory available for temporary storing video frames while storing the video frames received from external video camera in the memory in the intermittent recording mode; continuing to store the video frames in the memory until the amount of available memory calculated is smaller than a predetermined amount; and either reloading the magnetic tape unloaded or rotating the head drum stopped when the amount of available memory becomes equal to the predetermined amount.

According to the present invention, in the method for determining when magnetic tape/head drum is reloaded/ rotated to resume recording in time-lapse video tape recorder, a frame extraction ratio of video signal, or a ratio of the number of frames to be skipped and the number of frames to be recorded, is calculated from a recording time in a time-lapse recording mode that is set by a user. Based on the frame extraction ratio and the capacity of the memory in which the extracted video frames are temporarily stored, the remaining storage time of the memory is calculated which corresponds to the amount of the memory available for temporary storing.

When the remaining storage time of the memory becomes smaller than a predetermined reference period of time, before the memory is full the controller 500 executes commands to restart recording operation such as loading of the magnetic tape unloaded or rotating of the head drum stopped. Thus, when the number of video frames becomes the capacity of the memory, it is possible to record all the video frames that have been maximally stored in the memory without some time delay.

The above objectives, features, and advantages of the present invention will become apparent from the following detailed description of illustrative embodiments thereof to read in conjunction with the accompanying drawings.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings:

FIG. 7 is a table showing illustrative values of the maximum storage capacity of the field memory, tape reloading time/the head drum rotation time, and ratios of the number of the video frames stored in the field memory to the capacity of the field memory at the time when the tape starts to be reloaded or the head drum does to rotate.

DETAILED DESCRIPTION OF THE PREFERRED EMBODIMENTS

Figure 1:
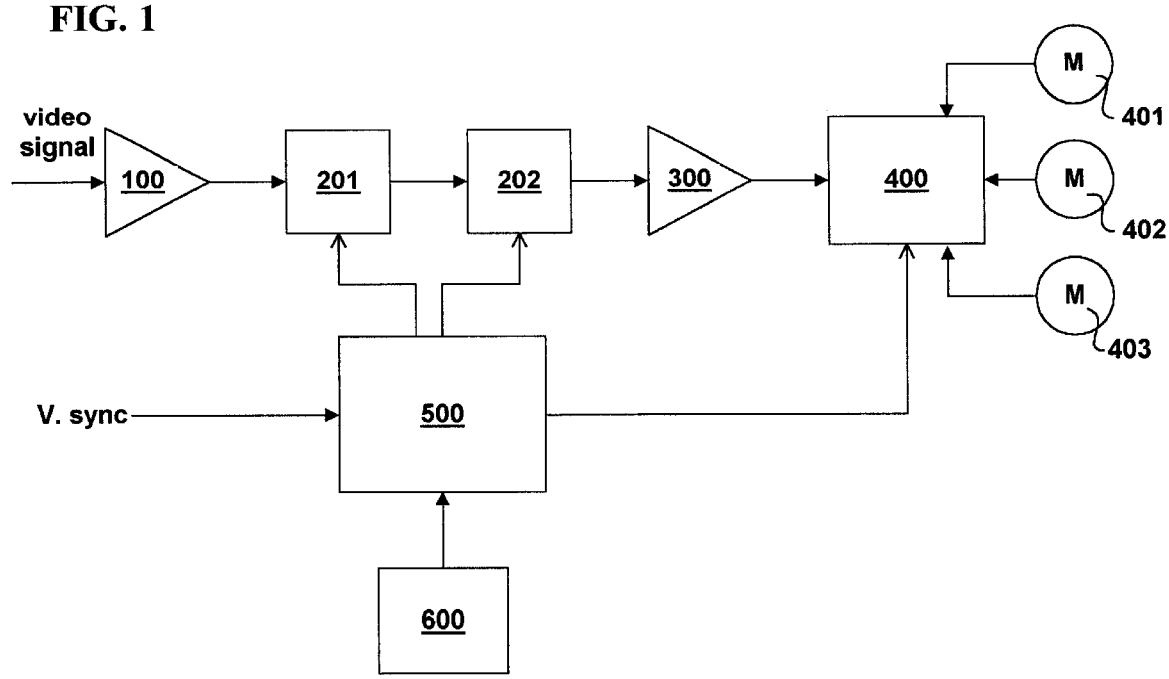
FIG. 1 shows a general block diagram of a conventional time-lapse video tape recorder.
Figure 2:
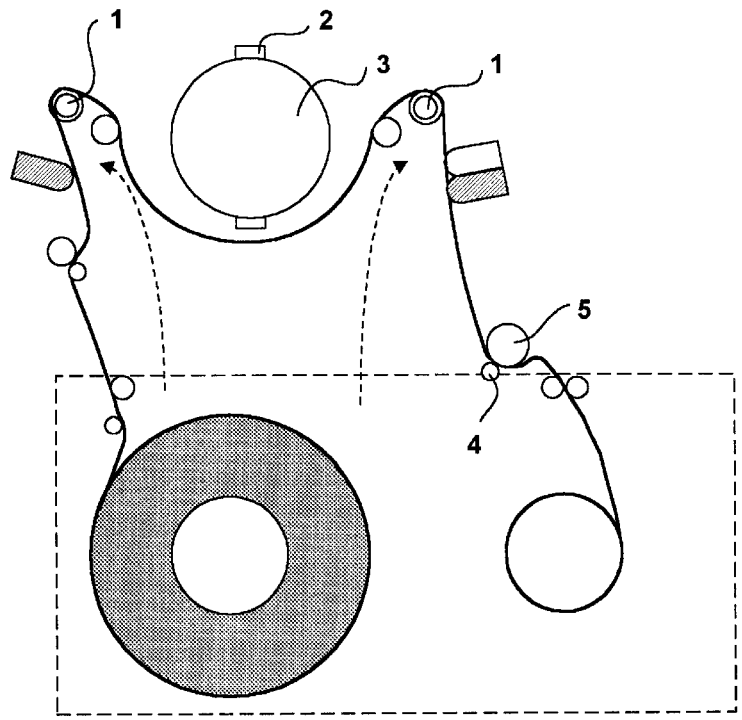
FIG. 2 shows a diagrammatic view of the recording unit when a magnetic tape is loaded for recording.
Figure 3:
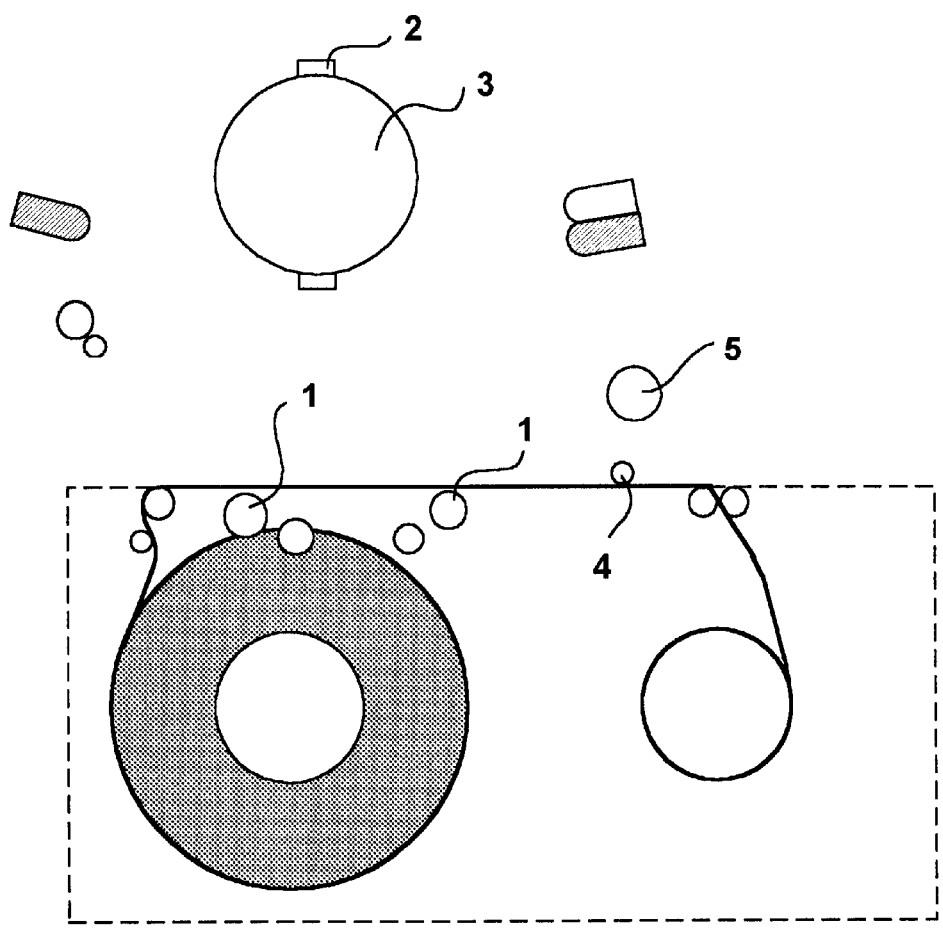
FIG. 3 shows a diagrammatic view of the recording unit when a magnetic tape is unloaded.
Figure 5:
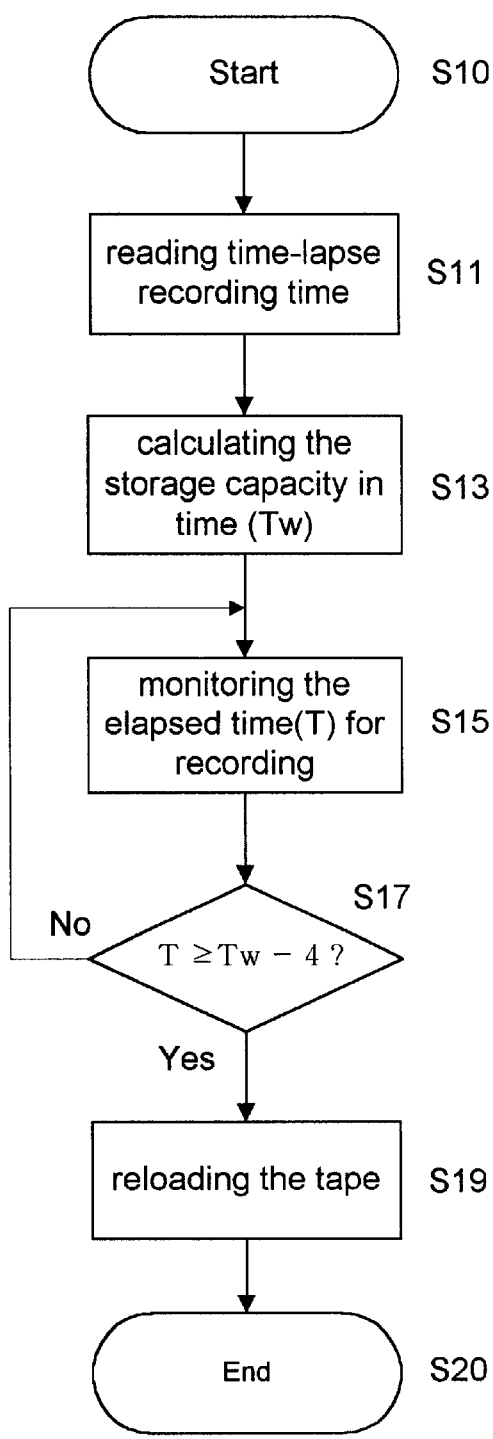
FIG. 5 is a flow chart of the method for determining the tape reloading time for recording resumption according to an embodiment of the present invention.

The method for determination of the tape reloading time for recording resumption in time-lapse video tape recorder according to an embodiment of the present invention is described below in detail with reference to schematic diagrams shown in FIGS. 1 to 3 and the flow chart of FIG. 5.

When a recording time is set by a user (S11), the controller 500 calculates a maximum period storage period, Tw that is taken for the field memory 202 to be filled with the video frames in the following way (S13). For an illustration of calculation of the maximum storage period, suppose that running time of a magnetic tape is 2 hours and maximum number of video frames that can be stored in the field memory 202 is 150, which corresponds to 5 seconds in a normal reproduction time. In the case of continuous recording with no time lapse, video signal from external video camera is digitized by the A/D converter 100 and is then stored in the field memory 202 via the buffer memory 201 without missing of any frame. In this case, the maximum storage period is 5 seconds(=150 frames/30 frame/second).

Figure 4:
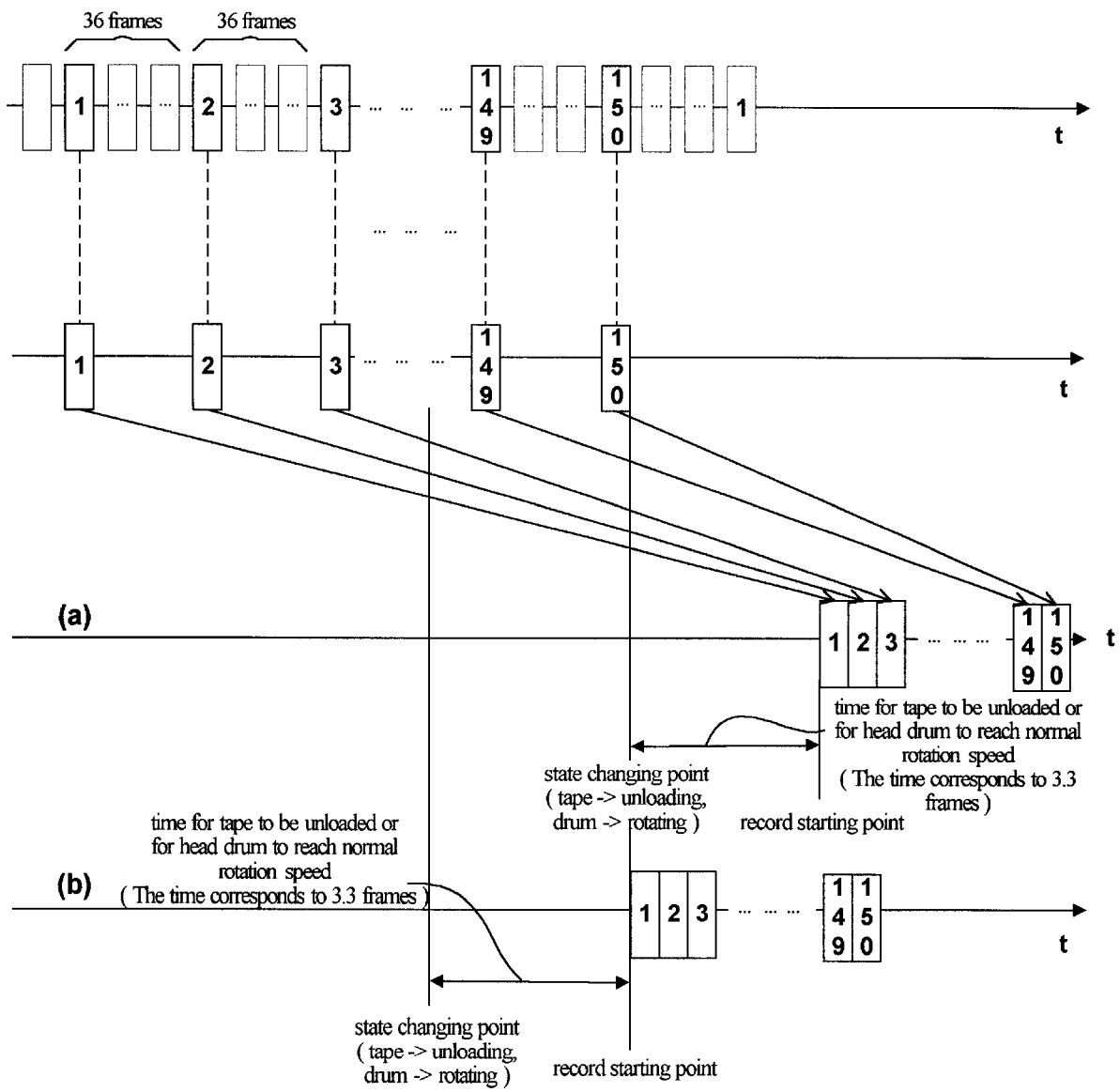
FIG. 4 is a diagram describing schematically the principle of the intermittent recording of a time-lapse video tape recorder.

On the other hand, if the time-lapse recording time of 72 hours is set by a user, or if a user intends to record the video signal received from external video camera during 72 hours with a magnetic tape of 2 hours running time, the video signal is recorded at a ratio of one frame to every 36 frames. As shown in FIG. 4, one frame chosen out of every 36 frames is digitized by the A/D converter 100 and is then stored in the field memory 202 through the buffer memory 201. In this case, the maximum storage capacity in time is 180 seconds (corresponding to 5400 frames), which is given by 150 frames (the capacity of the field memory)×36 (frame extraction ratio). The maximum storage capacity in time, is given by $$Tw=(Tm\times N)/30 \qquad (1)$$

where Tm is the capacity of the field memory expressed in the number of frames and N is the frame extraction ratio. The ratio in the above illustration is 36.

After the maximum storage capacity in time or the number of corresponding video frames (=Tm×N) is calculated, a total time which has elapsed since video frames started to be stored intermittently in the field memory 202, or the number of video frames to have been stored is being monitored based on the maximum storage capacity and a recording preparation time which is required to reload the tape and to be ready for recording (about 4 seconds in general ) (S15). When the total elapsed time becomes equal to (Tw-4 sec.), or when the number of video frames stored in the field memory is (150-120/36) (S17), the tape that has been unloaded in the recording unit 400 begins to be loaded (S19).

In the case that user intends to record video signal during 72 hours, for example, the controller 500 starts to perform operations necessary for recording resumption when the calculated elapsed time becomes 176 seconds (the maximum storage period of 180 seconds-4 seconds), or when the number of video frames stored in the field memory 202 becomes 146.6 (the capacity of the field memory 202, i.e., 150 frames minus 3.33 frames which corresponds to 4 seconds), as shown in FIG. 4.

Once the state of the recording unit 400 enters the recording mode, the magnetic tape is loaded by the drum motor 402. At the same time, the head drum 2 starts to rotate and reaches to a normal rotation speed by the drum motor 402. When 4 seconds elapse, those operations have been completed and, at the same time the field memory becomes filled with 150 video frames. Then, all the video frames which have been stored maximally in the field memory 202 are retrieved and are then recorded successively without any time delay due to preparation of recording resumption.

Figure 6:
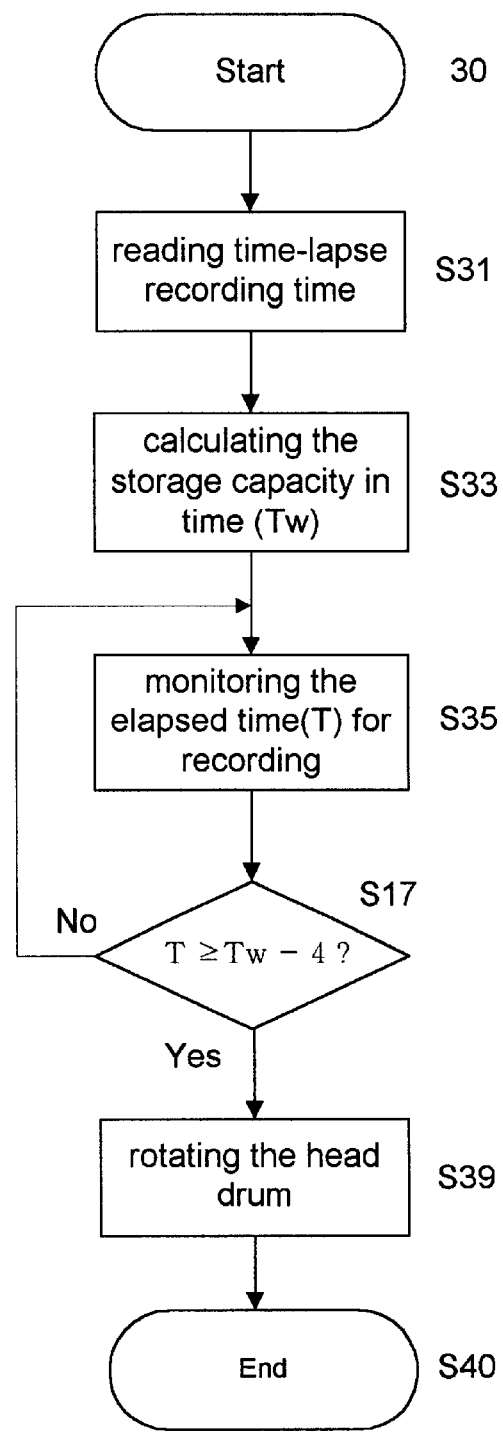
FIG. 6 is a flow chart of the method for determining the head drum rotation time for recording resumption according to another embodiment of the present invention.

FIG. 6 shows a flow chart of a method for determining the head drum rotating time for recording resumption in time-lapse video tape recorder according to another embodiment of the present invention. With the same procedures as those shown FIG. 5, the maximum storage period of the field memory 202 is calculated based on the time-lapse recording time set by a user. And it is continuously checked whether the total time that elapsed since video frames started to be stored in the field memory 202 is equal to Tw−4 (S31~S37). When it becomes equal to Tw−4, the head drum 3 that has been stopped during the recording pause period starts to rotate (S39).

It usually takes 4 seconds or so for the rotation of the head drum 3 to reach the normal rotation speed. As in the method for determining the tape reloading time explained above, since the 4 seconds elapse, 150 video frames which have been stored maximally in the field memory 202 are retrieved and are then recorded successively without any time delay.

Given that the capacity of the field memory 202 is 150 frames or 5 seconds and the recording preparation periods of two methods according to the present invention are all 4 seconds, FIG. 7 shows different values of the maximum storage capacity in time of the field memory 202, tape reloading time/head drum rotation time, and ratios of the number of the video frames that are stored in the field memory at the switching time to the capacity of the field memory according to various values of recording time in the time-lapse recording mode.

Because it takes 5 seconds to record 150 video frames in the field memory 202 on the magnetic tape and no waiting time to record the stored video frames is necessary when the field memory 202 becomes full, the size of 15 frames is sufficient for the buffer memory 201 if the frame extraction ratio is 10. On the other hand, in conventional time-lapse tape recorders, the buffer memory needs at least size of 27 frames, which are 15 frames plus 12 frames (=30 frames/ second*4 seconds/10).

The method according to the present invention makes it possible to achieve the optimal size of the buffer memory which is needed to store input video frames temporarily during recording operation because video frames in the field memory can be recorded successively without any time delay.

The foregoing is provided only for the purpose of illustration and explanation of the preferred embodiment of the present invention, so changes, variations and modifications may be made without departing from the spirit and scope of the invention.

What is claimed is:

1. A method for determination of a tape reloading time for recording resumption in time-lapse video tape recorder, comprising the steps of:

storing intermittent video frames in a memory while calculating a remaining storage amount of said memory;

continuing to store the video frames in said memory until said remaining storage amount becomes equal to a predetermined value; and reloading a video tape that has been unloaded when said remaining storage amount becomes equal to said predetermined value.

2. A method according to claim 1, wherein said predetermined value is corresponding to a time which is required for the video tape to completing reloading operation for recording resumption.

3. A method for determination of a head drum rotation time for recording resumption in time-lapse video tape recorder, comprising the steps of:

storing intermittent video frames in a memory while calculating a remaining storage amount of said memory;

continuing to store the video frames in said memory until said remaining storage amount becomes equal to a predetermined value; and rotating the head drum that has been stopped when said remaining storage amount becomes equal to said predetermined value.

4. A method according to claim 3, wherein said predetermined value is corresponding to a time which is required for the head drum to rotate at a normal rotation speed.

* * * * *